(12) United States Patent
Kumeuchi et al.

(10) Patent No.: US 11,769,914 B2
(45) Date of Patent: Sep. 26, 2023

(54) WORKING VEHICLE

(71) Applicant: TAKEUCHI MFG. CO., LTD., Nagano (JP)

(72) Inventors: Kengo Kumeuchi, Nagano (JP); Shumpei Okutani, Nagano (JP); Tetsuya Matsumoto, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 477 days.

(21) Appl. No.: 17/120,522

(22) Filed: Dec. 14, 2020

(65) Prior Publication Data

US 2022/0069362 A1 Mar. 3, 2022

(30) Foreign Application Priority Data

Aug. 28, 2020 (JP) ................................. 2020-144007

(51) Int. Cl.
*H01M 10/42* (2006.01)
*B60L 53/50* (2019.01)
(Continued)

(52) U.S. Cl.
CPC .......... *H01M 10/425* (2013.01); *B60K 35/00* (2013.01); *B60L 50/60* (2019.02); *B60L 53/50* (2019.02);
(Continued)

(58) Field of Classification Search
CPC .......... H01M 10/425; H01M 10/0525; H01M 10/06; H01M 10/441; H01M 10/46;
(Continued)

(56) References Cited

U.S. PATENT DOCUMENTS 8,030,860 B2 * 10/2011 Yoshioka ................ H02J 9/005
318/434
8,125,105 B2 * 2/2012 Ishida ..................... B60L 58/20
307/82
(Continued)

FOREIGN PATENT DOCUMENTS

| JP | 4284334 B2 | 6/2009 |
| JP | 5371209 B2 | 12/2013 |
| JP | 2019190105 A | 10/2019 |

OTHER PUBLICATIONS

Extended European Search Report dated Apr. 6, 2021 in European Application No. 20205106.6.

*Primary Examiner* — James M Dolak
(74) *Attorney, Agent, or Firm* — Stephen J. Weyer, Esq.; Stites & Harbison, PLLC

(57) ABSTRACT

There is provided a working vehicle with increased safety by preventing deterioration of a battery due to over-discharge of the battery caused by an operator not noticing occurrence of a malfunction in driving by connected to an external power source. The working vehicle includes a charger, the battery, a sensor, a drive unit, a controller, a display unit, a battery management system, and a switch, in which the battery management system is configured to control the working vehicle to be switched to the driving by connected to the external power source when the switch is turned on after the charger is connected to an external power source and a valid signal for driving by connected to the external power source is received.

14 Claims, 3 Drawing Sheets

(51) Int. Cl.
*B60L 58/18* (2019.01)
*B60L 50/60* (2019.01)
*B60L 53/62* (2019.01)
*B60L 58/14* (2019.01)
*B60K 35/00* (2006.01)
*H01M 10/0525* (2010.01)
*H01M 10/06* (2006.01)
*H01M 10/44* (2006.01)
*H01M 10/46* (2006.01)
*H01M 10/48* (2006.01)
*B60R 16/00* (2006.01)

(52) U.S. Cl.
CPC ............... *B60L 53/62* (2019.02); *B60L 58/14* (2019.02); *B60L 58/18* (2019.02); *H01M 10/0525* (2013.01); *H01M 10/06* (2013.01); *H01M 10/441* (2013.01); *H01M 10/46* (2013.01); *H01M 10/48* (2013.01); *B60L 2200/40* (2013.01); *B60R 16/005* (2013.01); *H01M 2010/4271* (2013.01); *H01M 2220/20* (2013.01)

(58) Field of Classification Search
CPC ......... H01M 10/48; H01M 2010/4271; H01M 2020/20; B60K 35/00; B60L 50/60; B60L 50/53; B60L 50/00; B60L 50/50; B60L 53/50; B60L 53/62; B60L 53/00; B60L 53/10; B60L 53/60; B60L 58/14; B60L 58/18; B60L 58/00; B60L 58/10; B60L 58/12; B60L 58/13; B60L 58/15; B60L 2200/40; B60R 16/005
See application file for complete search history.

(56) References Cited

U.S. PATENT DOCUMENTS

| | | | | |
|---|---|---|---|---|
| 8,714,286 B2* | 5/2014 | Kouvo | .................... | B60L 50/53 |
| | | | | 191/4 |
| 8,798,832 B2* | 8/2014 | Kawahara | ............... | B60L 58/26 |
| | | | | 701/32.7 |
| 8,975,773 B2* | 3/2015 | Huang | .................... | B60L 53/14 |
| | | | | 320/109 |
| 9,278,624 B2* | 3/2016 | Kinomura | ............... | B60L 53/16 |
| 9,446,671 B2* | 9/2016 | Izumi | ..................... | H02J 50/10 |
| 9,580,966 B2* | 2/2017 | Rudinec | .................. | E21B 7/025 |
| 9,725,879 B2* | 8/2017 | Bystedt | .................. | E02F 9/205 |
| 9,751,423 B2* | 9/2017 | Niioka | ............ | H01M 10/6571 |
| 10,017,059 B2* | 7/2018 | Kuribara | ............... | B60L 1/003 |
| 10,086,707 B2* | 10/2018 | Kouvo | .................... | B60L 58/12 |
| 10,259,338 B2* | 4/2019 | Bryngelsson | ....... | H01M 10/615 |
| 10,326,177 B2* | 6/2019 | Chang | .................. | H01M 10/44 |
| 10,749,224 B2* | 8/2020 | Podolefsky | ............. | H02P 27/04 |
| 10,974,617 B2* | 4/2021 | Hiroe | .................. | G01R 31/382 |
| 11,063,536 B2* | 7/2021 | Tiihonen | ................ | B60L 1/003 |
| 11,097,620 B2* | 8/2021 | Yamamoto | ................ | B60L 3/04 |
| 11,208,007 B2* | 12/2021 | Kumeuchi | ............ | H02J 7/0025 |
| 11,223,215 B2* | 1/2022 | Hiroe | .................... | H02J 7/0024 |
| 11,673,477 B2* | 6/2023 | Sopko, Jr. | ............... | B60L 50/66 |
| | | | | 60/221 |
| 2010/0096921 A1 | 4/2010 | Ishida et al. | | |
| 2015/0130414 A1 | 5/2015 | Izumi | | |
| 2020/0223096 A1* | 7/2020 | Pirri | ........................ | B28C 5/422 |

\* cited by examiner

WORKING VEHICLE

CROSS-REFERENCE TO RELATED APPLICATION

This application is based upon and claims the benefit of priority of the prior Japanese Patent Application No. P2020-144007, filed on Aug. 28, 2020, and the entire contents of which are incorporated herein by reference.

TECHNICAL FIELD

The present invention relates to a working vehicle.

BACKGROUND ART

In related art, a working vehicle having a configuration including a power source monitoring controller is known (PTL 1: Japanese Patent No. 4284334). There is proposed a configuration for improving difference feeling in actuator operation caused by difference between battery driving and driving by an external power source (PTL 2: Japanese Patent No. 5371209). Then, there is also proposed a configuration allowing the vehicle to shift to a first power source mode in which a motor is driven while continuing charging a battery from an external power source in a case where operation of a hydraulic actuator is limited (PTL 3: JP-A-2019-190105). The first power source mode is considered as a kind of driving by connected to the external power source. Here, the output of a charger is enough when a load of a drive unit is lower than the output of the charger in the driving by connected to the external power source; therefore, the battery is charged. On the other hand, the output of the charger is not enough when the load of the drive unit exceeds the output of the charger in the driving connected to the external power source; therefore, an operation for responding to increase of the load of the drive unit is performed with the output from the battery in addition to the output from the charger. In the following description, to actuate the drive unit by connecting the charger to the external power source is expressed as driving by connected to the external power source in the specification.

SUMMARY OF INVENTION

Technical Problem

However, there is a case where the battery is over-discharged because the operator does not notice at the time of driving by connected to the external power source in related art. There is an issue that deterioration of the battery proceeds when the battery is over-discharged.

Solution to Problem

In response to the above issue, one or more aspects of the present invention are directed to a working vehicle with increased safety as compared with related art by preventing deterioration of the battery due to over-discharge of the battery caused by the operator not noticing the occurrence of a malfunction in the driving by connected to the external power source.

The present invention has been accomplished under the solutions as described below.

A working vehicle according to the present invention includes a charger operated by being connected to an external power source, a battery, a sensor detecting charging current to the battery, a drive unit hydraulically operated by electric power supplied from either or both of the charger and the battery, a controller, a display unit, a battery management system monitoring both of the charger and the battery in a state of driving by connected to the external power source after receiving a valid signal for driving by connected to the external power source from the controller, and a switch relating to operation of the driving by connected to the external power source, in which the battery management system is configured to control the working vehicle to be switched to the driving by connected to the external power source when the switch is turned on after the charger is connected to the external power source and the valid signal for driving by connected to the external power source is received, and the battery management system is configured to control the working vehicle to be switched to the driving by connected to the external power source when the charger is connected to the external power source after the switch is turned on and the valid signal for driving by connected to the external power source is received.

According to the configuration, the battery management system judges whether switching to the driving by connected to the external power source is possible or not in the state where the charger is operated; therefore, it is possible to prevent occurrence of a malfunction such that connection between the charger and the external power source is lost at the time of switching to the driving by connected to the external power source. Accordingly, power can be positively supplied to the drive unit from the charger at the time of driving by connected to the external power source; therefore, a working vehicle with increased safety as compared with related art and capable of preventing deterioration of the battery due to over-discharge of the battery is realized.

It is preferable that the battery management system is configured to monitor a state-of-charge of the battery by receiving a detection signal from the sensor detecting charging current to the battery, and is configured to output a warning signal to the controller when occurrence of an abnormity is judged in the state of driving by connected to the external power source. According to the configuration, the battery management system judges the abnormity in the state of driving by connected to the external power source while monitoring the charger and the battery by receiving the detection signal from the sensor detecting charging current to the battery in the state of driving by connected to the external power source, as a result, the battery management system outputs the warning signal to the controller when determining occurrence of the abnormity. The controller receiving the warning signal performs control so that the abnormity is notified to the operator by either or both of a warning and an alarm. Either or both of the warning and the alarm is transmitted to the operator by a speaker or a screen attached to the display unit as an example. Therefore, the operator can instantly notice the abnormity in the state of driving by connected to the external power source.

It is preferable that the battery management system is configured to output the warning signal to the controller when an output from the charger is stopped in the state of the driving by connected to the external power source. According to the configuration, the abnormity of the charger is instantly notified to the operator in the state of the driving by connected to the external power source; therefore, the safety of the working vehicle can be further increased.

It is preferable that the battery management system is configured to output the warning signal to the controller when the state-of-charge of the battery becomes a lower limit in the state of the driving by connected to the external power source. According to the configuration, the abnormity of the battery is instantly notified to the operator in the state of the driving by connected to the external power source; therefore, the safety of the working vehicle can be further increased.

It is preferable that the battery management system is configured to perform control so that discharging power discharged from the battery is suppressed to be equal to or lower than charging power charged to the battery when the state-of-charge of the battery becomes the lower limit in the state of the driving by connected to the external power source. According to the configuration, the battery is positively charged even in the state of driving by connected to the external power source in addition to the state of charging; therefore, over-discharge of the battery can be prevented.

It is preferable that the battery management system is configured to control the state-of-charge of the battery not to exceed an upper limit when the battery is fully charged in the state of the driving by connected to the external power source. According to the configuration, over-discharge of the battery can be prevented in the state of driving by connected to the external power source.

It is preferable that the battery management system is configured to be reset to a state before the working vehicle is switched to the driving by connected to the external power source by turning off the switch and by stopping the charger. According to the configuration, the battery management system is reset to the state before the working vehicle is switched to the driving by connected to the external power source by releasing the driving by connected to the external power source and by stopping the charger, and the battery management system is restarted by turning on the switch again by the operator in the reset state. That is, the battery management system judges whether switching to the driving by connected to the external power source is possible or not after being restarted in the state where the charger is operated; therefore, it is possible to prevent occurrence of an unexpected malfunction such that connection between the charger and the external power source is lost at the time of switching to the driving by connected to the external power source, even after being restarted.

As an example, the working vehicle may further include a first-relay and a second-relay, in which the battery management system may be configured to connect the charger to the battery by performing on-control of the first-relay, configured to connect the battery to the drive unit by performing on-control of the second-relay, and configured to connect the charger, the battery, and the drive unit by performing on-control of the first-relay and the second-relay.

As an example, the battery may be a lithium-ion rechargeable battery, and the working vehicle may be provided with a lead-acid battery supplying power to the battery management system when the switch is turned on and a third-relay, in which the battery management system may be configured to connect the lithium-ion rechargeable battery to the controller by performing on-control of the third-relay.

As an example, the charger may include a fourth-relay, and the fourth-relay is operated and the lead-acid battery is connected to the battery management system when the charger is connected to the external power source, then, power is supplied from the lead-acid battery to the battery management system.

Advantageous Effects of Invention

According to the present invention, it is possible to realize a working vehicle with increased safety as compared with related art by preventing deterioration of the battery due to over-discharge of the battery caused by the operator not noticing the occurrence of a malfunction in the driving by connected to the external power source.

DESCRIPTION OF EMBODIMENTS

Figure 3:
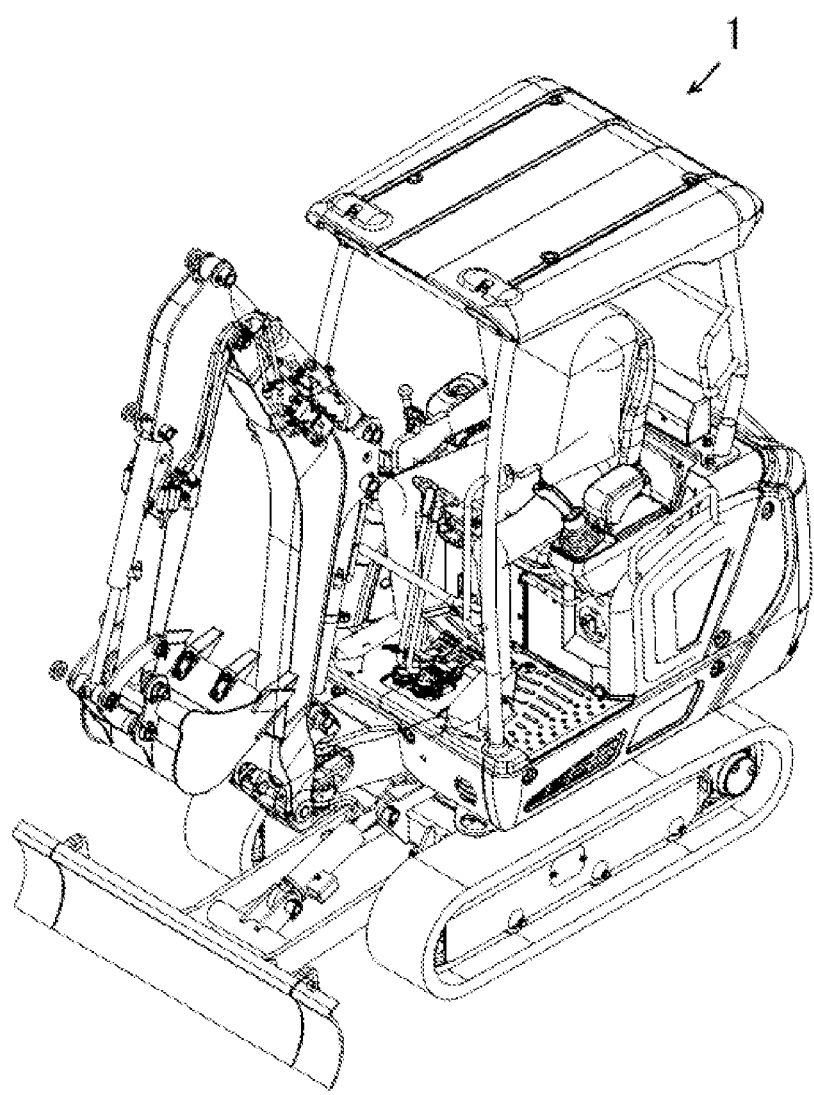
FIG. 3 is a schematic external view showing the working vehicle according to the embodiment.

Hereinafter, an embodiment of the present invention will be explained in detail with reference to the drawings. A working vehicle 1 to which the embodiment is applied is a battery-type working vehicle such as a power shovel, a skid-steer loader, a carrier or other known vehicles as shown in FIG. 3 as an example. A drive unit 2 of the working vehicle 1 is a hydraulic drive mechanism such as an electric actuator like an electric motor or other known mechanisms. The drive unit 2 is operated by electric power supplied from either or both of a charger 8 and a battery 9 and is drive-controlled by a controller 3. A battery management system 5 is configured to monitor a state-of-charge of the battery 9 based on a detection signal from a sensor 7 detecting charging current to the battery 9 and is also configured to monitor the charger 8 based on the detection signal from the sensor 7 detecting charging current to the battery 9. The battery management system 5 may be denoted by a BMS 5 in the following description. Note that the same signs and numerals are assigned to components having the same functions and repeated explanation thereof may be omitted in all drawings for explaining the embodiment.

Figure 1:
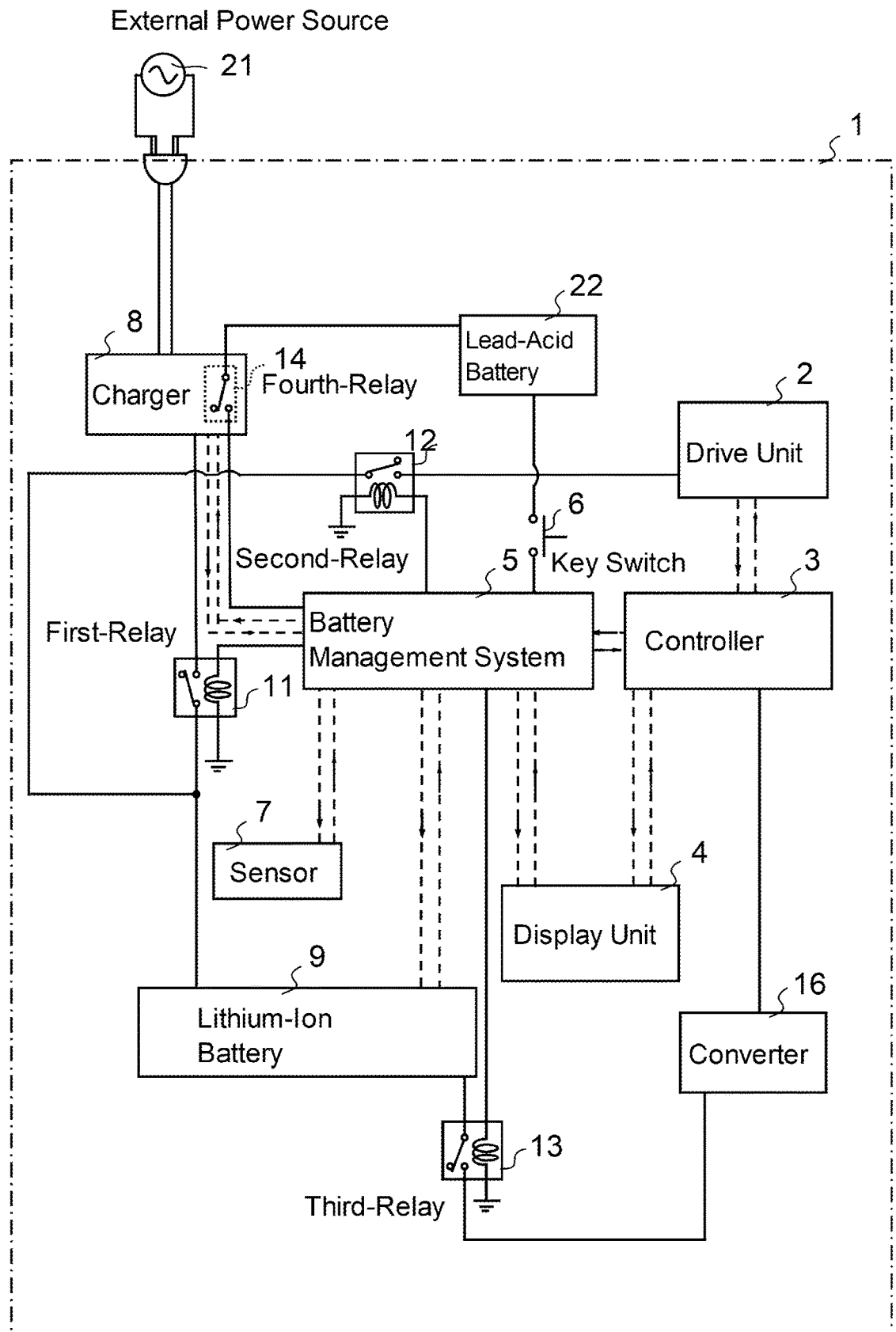
FIG. 1 is a schematic circuit diagram showing a configuration of a working vehicle according to an embodiment.

As shown in FIG. 1, the working vehicle 1 includes the charger 8 operated by being connected to an external power source 21, the battery 9 connected to the charger 8, the drive unit 2 operated by the electric power being supplied from either or both of the charger 8 and the battery 9, the controller 3 controlling the drive unit 2, a display unit 4 connected to the controller 3, the BMS 5 monitoring both of the charger 8 and the battery 9 in a state of driving by connected to the external power source after receiving a valid signal for driving by connected to the external power source from the controller 3, and a switch 6 for starting the BMS 5. The switch 6 is a key switch or a start switch as an example, which can adopt a known structure. The display unit 4 is configured to display, for example, operating information of the drive unit 2, operating information of the charger 8, start-of-charge information of the battery 9, and other known vehicle information, displaying a warning on a display screen when an abnormity occurs as well as giving an alarm from a speaker when an abnormity occurs.

In the example of FIG. 1, a first-relay 11, a second-relay 12, and a third-relay 13 which are operated by control of the BMS 5 are provided. A fourth-relay 14 which is operated when the charger 8 is connected to the external power source 21 is also provided. The first-relay 11, the second-relay 12, and the third-relay 13 are connected to the BMS 5, or the first-relay 11, the second-relay 12, and the third-relay 13 are attached to the BSM 5. The fourth-relay 14 is built in the charger 8 or attached to the charger 8.

In the example of FIG. 1, a lead-acid battery 22 supplying the power to the battery management system 5 when the switch 6 is turned on is provided. The BMS 5 performs on-control of the third-relay 13 to thereby connect the lithium-ion rechargeable battery 9 to the controller 3 through a converter 16. That is, the power outputted from the lithium-ion rechargeable battery 9 is stepped down in the converter 16 and supplied to the controller 3 in a state where the third-relay 13 is operated. Note that a configuration in which the converter 16 is not provided may be adopted. It is also possible to output a voltage compatible to a power source voltage of the controller 3 which is previously set from the lithium-ion rechargeable battery 9 and supply the voltage to the controller 3 as an example.

In the example of FIG. 1, the BMS 5 is configured to connect the charger 8 to the lithium-ion rechargeable battery 9 by performing on-control of the first-relay 11. That is, the power outputted from the charger 8 is charged in the lithium-ion rechargeable battery 9 in a state where the first-relay 11 is operated. Moreover, the BMS 5 is configured to connect the lithium-ion rechargeable battery 9 to the drive unit 2 by performing on-control of the second-relay 12. That is, the power outputted from the lithium-ion rechargeable battery 9 is supplied to the drive unit 2 in a state where the second-relay 12 is operated. Then, the BMS 5 is configured to connect the charger 8, the lithium-ion rechargeable battery 9, and the drive unit 2 by performing on-control of the first-relay 11 and the second-relay 12. That is, the power outputted from either or both of the charger 8 and the lithium-ion rechargeable battery 9 is supplied to the drive unit 2 in the state where the first-relay 11 is operated as well as in the state where the second-relay 12 is operated.

In the example of FIG. 1, the charger 8 includes the fourth-relay 14. The charger 8 is started and the fourth-relay 14 is operated when the charger 8 is connected to the external power source 21, then, the lead-acid battery 22 and the BMS 5 are connected. That is, the power is supplied from the lead-acid battery 22 to the BMS 5 in a state where the fourth-relay 14 is operated.

In the example of FIG. 1, the charger 8 is operated and is capable of supplying DC power to the drive unit 2 as well as to the battery 9 when connected to the external power source 21 such as a commercial power source. The charger 8 is mounted on the vehicle. The BMS 5 is configured to be connected to the lead-acid battery 22 through the switch 6 as an example. That is, the power is supplied to the BMS 5 from the lead-acid battery 22 in a state where the switch 6 is ON. According to the example, the power is supplied to the BMS 5 in two systems of the lead-acid battery 22 and the charger 8; therefore, the safe and stable working vehicle 1 can be realized.

The output current of the charger 8 at the time of operation is set to a fixed value as an example. The battery 9 is a lithium-ion rechargeable battery as an example, which is configured by connecting a number of cells. The converter 16 is a DC-DC converter, having a function of stepping down DC voltage to be outputted. A contact type relay such as an electromagnetic switch, or a non-contact type relay such as a MOS-FET relay or a solid-state relay is adopted as the first-relay 11, the second-relay 12, the third-relay 13, and the fourth-relay 14, respectively. The working vehicle 1 is provided with the sensor 7 for detecting charging current of the battery 9. The sensor 7 is a current sensor as an example, having a function of detecting the charging current of the battery 9. The sensor 7 is also capable of detecting discharging current from the battery 9.

Figure 2:
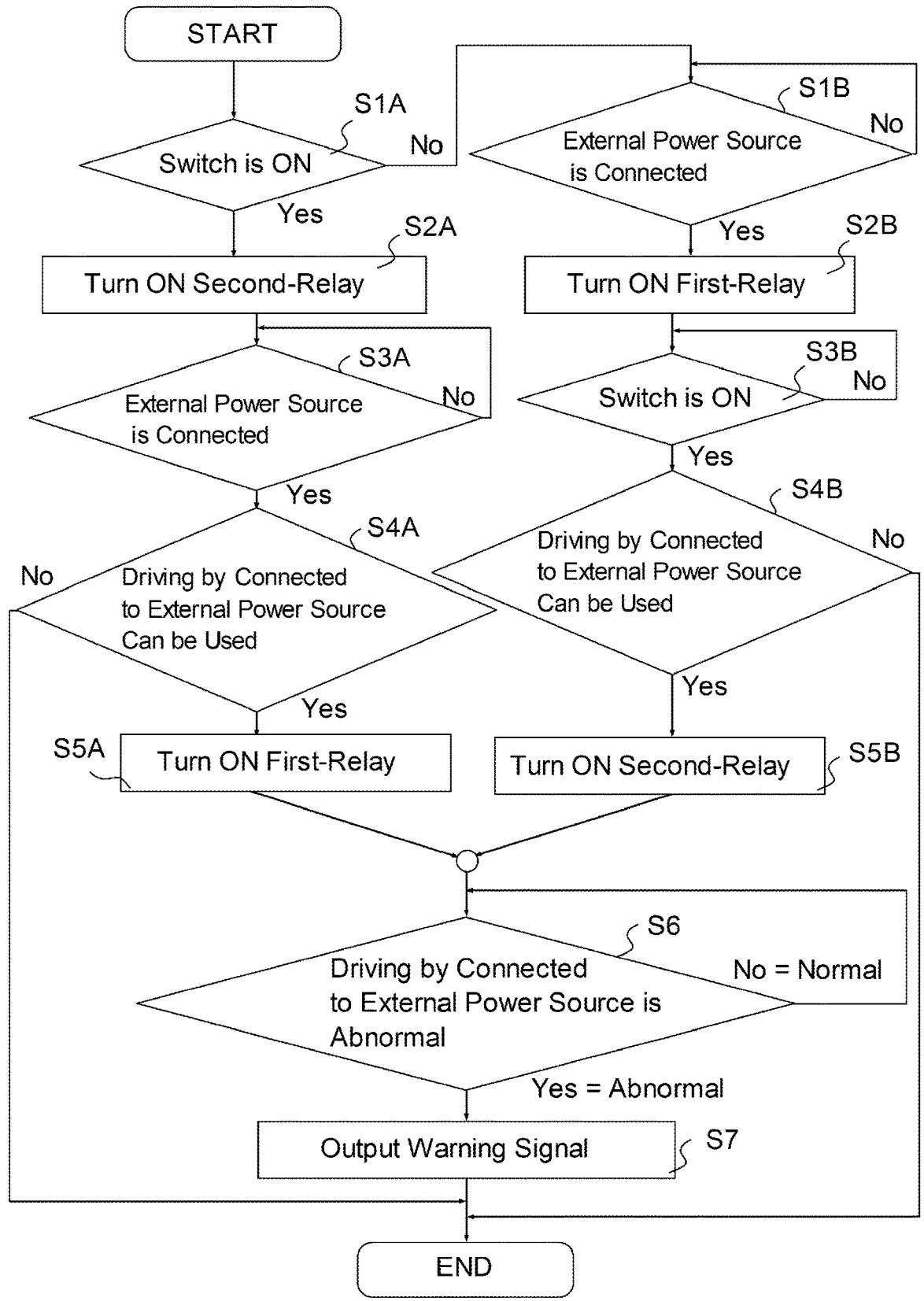
FIG. 2 is a flowchart showing an operation procedure of a battery management system in the working vehicle according to the embodiment.

FIG. 2 is a flowchart showing an operation procedure of the BMS 5 in the working vehicle 1 according to the embodiment. The operation procedure of the BMS 5 in the working vehicle 1 will be continuously explained below.

[Driving by Connected to External Power Source: A]

After turning on the switch 6 first, an operator connects the charger 8 to the external power source 21. The BMS 5 is started when the switch 6 is turned on, and the process proceeds to Step S1A where ON of the switch 6 is confirmed. As the switch 6 is in ON-state, the process proceeds to Step S2A where the second-relay 12 is turned on. Subsequently, the process proceeds to Step S3A where connection between the charger 8 and the external power source 21 is confirmed. As the charger 8 and the external power source 21 are connected at this time, the process proceeds to Step S4A where validity of the driving by connected to the external power source is judged. When the valid signal for driving by connected to the external power source is received from the controller 3, it is determined that the driving by connected to the external power source is valid, and the process proceeds to Step S5A where the first-relay is turned on. According to the configuration, the BMS 5 judges whether switching to the driving by connected to the external power source is possible or not in the state where the charger 8 is operated; therefore, it is possible to prevent occurrence of a malfunction such that connection between the charger and the external power source is lost at the time of switching to the driving by connected to the external power source.

[Driving by Connected to External Power Source: B]

After connecting the charger 8 to the external power source 21 first, the operator turns on the switch 6. When the charger 8 is connected to the external power source 21, the BMS 5 is started, and the process proceeds to Step S1A where ON of the switch 6 is confirmed. As the switch is not in ON-state, the process proceeds to Step S1B where the connection between the charger 8 and the external power supply 21 is confirmed. As the charger 8 is connected to the external power source 21, the process proceeds to Step S2B where the first-relay 11 is turned on, then, proceed to Step S3B where ON of the switch 6 is confirmed. As the switch 6 is in ON-state at this time, the process proceeds to Step S4B where validity of the driving by connected to the external power source is determined. When the valid signal for driving by connected to the external power source is received from the controller 3, it is determined that the driving by connected to the external power source is valid, and the process proceeds to Step S5B where the second-relay is turned on. According to the configuration, the BMS 5 judges whether switching to the driving by connected to the external power source is possible or not in the state where the charger 8 is operated; therefore, it is possible to prevent occurrence of a malfunction such that connection between the charger and the external power source is lost at the time of switching to the driving by connected to the external power source.

[Judge of Abnormity in Driving by Connected to External Power Source]

After Step S5A, or Step S5B, the BMS 5 proceeds to Step S6 where an abnormity in the driving by connected to the external power source is judged. The BMS 5 judges that the driving by connected to the external power source is in an abnormal state when the output from the charger 8 is stopped in the state of the driving by connected to the external power source. The BMS 5 judges that the driving by connected to the external power source is in the abnormal state when the state-of-charge of the lithium-ion rechargeable battery 9 becomes a lower limit in the state of the driving by connected to the external power source as an example. Then, the BMS 5 proceeds to Step S7 where a warning signal is outputted to the controller 3 when the abnormality in the driving by connected to the external power source is determined. The controller 3 receiving the warning signal performs control so that the abnormality is notified to the operator by either or both of the warning and the alarm. Either or both of the warning and the alarm is transmitted to the operator by the speaker or the screen attached to the display unit 4. Therefore, the operator can instantly notice the abnormality in the driving by connected to the external power source.

Here, the BMS 5 is configured to perform control so that discharging power discharged from the lithium-ion rechargeable battery 9 is suppressed to be equal to or lower than charging power charged in the lithium-ion rechargeable battery 9 when the state-of-charge of the lithium-ion rechargeable battery 9 becomes the lower limit in the state of the driving by connected to the external power source. According to the configuration, the lithium-ion rechargeable battery 9 is positively charged not only in the state of charging but also in the state of the driving by connected to the external power source; therefore, it is possible to prevent the battery from being over-discharged.

Here, the BMS 5 is configured to control the state-of-charge of the lithium-ion rechargeable battery 9 not to exceed an upper limit when the lithium-ion rechargeable battery 9 is fully charged in the state of the driving by connected to the external power source. According to the configuration, it is possible to prevent the lithium-ion rechargeable battery 9 from being over-discharged in the state of the driving by connected to the external power source.

[End of Driving by Connected to External Power Source]

When the warning signal is outputted and the operator notices the abnormality in the state of the driving by connected to the external power source, or when the driving by connected to the external power source is not valid, the operator turns off the switch 6.

Here, the BMS 5 is configured to be reset to a state before the working vehicle is switched to the driving by connected to the external power source by turning off the switch 6 and by stopping the charger 8. According to the configuration, the BMS 5 is reset to the state before the working vehicle is switched to the driving by connected to the external power source by releasing the driving by connected to the external power source and stopping the charger 8. The battery management system is restarted when the operator turns on the switch 6 again in the reset state. That is, the BMS 5 judges whether switching to the driving by connected to the external power source is possible or not after being restarted in the state where the charger 8 is operated; therefore, it is possible to prevent occurrence of an unexpected malfunction such that the connection between the charger 8 and the external power source 21 is lost at the time of switching to the driving by connected to the external power source even after the BMS 5 is restarted.

The above working vehicle 1 may change specifications appropriately in accordance with specifications and so on. The present invention is not limited to the above-described embodiment and various alternations may occur within a scope not departing from the present invention.

What is claimed is:

1. A working vehicle comprising:
    a charger that is connectable to an external power source;
    a battery;
    a sensor detecting charging current to the battery;
    a drive unit hydraulically operated by electric power supplied from at least one of the charger and the battery;
    a controller;
    a display unit;
    a battery management system monitoring both of the charger and the battery in a state of driving by connection to the external power source after receiving a valid signal for driving by connection to the external power source from the controller, the valid signal indicating that the external power source can be used; and
    a switch connection to the external power source for operation of the working vehicle,
    wherein the battery management system is configured to control the working vehicle to be switched to the driving by connection to the external power source when the switch is turned on after the charger is connected to the external power source and the valid signal for driving by connected to the external power source is received from the controller, and
    the battery management system is configured to control the working vehicle to be switched to the driving by connection to the external power source when the charger is connected to the external power source after the switch is turned on and the valid signal for driving by connection to the external power source is received from the controller.

2. The working vehicle according to claim 1, wherein the battery management system is configured to output a warning signal to the controller when an output from the charger is stopped in the state of the driving by connection to the external power source.

3. The working vehicle according to claim 1, wherein the battery management system is configured to output a warning signal to the controller when a state-of-charge of the battery becomes a lower limit in the state of the driving by connection to the external power source.

4. The working vehicle according to claim 3, wherein the battery management system is adapted to control discharging power discharged from the battery to be suppressed to be equal to or lower than charging power charged to the battery when the state-of-charge of the battery becomes the lower limit in the state of the driving by connected to the external power source.

5. The working vehicle according to claim 1, wherein the battery management system is configured to control the state-of-charge of the battery not to exceed an upper limit when the battery is fully charged in the state of the driving by connection to the external power source.

6. The working vehicle according to claim 1, wherein the battery management system is configured to be returned to a state before the working vehicle was switched to the driving by connection to the external power source by turning off the switch and by stopping the charger.

7. The working vehicle according to claim 1, further comprising:
    a first-relay and a second-relay,
    wherein the battery management system is configured to connect the charger to the battery by performing on-control of the first-relay, configured to connect the battery to the drive unit by performing on-control of the second-relay, and configured to connect the charger, the battery, and the drive unit by processing on-control of the first-relay and the second-relay.

8. The working vehicle according to claim 1, wherein the battery is a lithium-ion rechargeable battery,
   a lead-acid battery supplying power to the battery management system when the switch is turned on and a third-relay present, and
   the battery management system is configured to connect the lithium-ion rechargeable battery to the controller by processing on-control of the third-relay.

9. The working vehicle according to claim 2, wherein the battery is a lithium-ion rechargeable battery,
   a lead-acid battery supplying power to the battery management system when the switch is turned on and a third-relay present, and
   the battery management system is configured to connect the lithium-ion rechargeable battery to the controller by processing on-control of the third-relay.

10. The working vehicle according to claim 3, wherein the battery is a lithium-ion rechargeable battery,
    a lead-acid battery supplying power to the battery management system when the switch is turned on and a third-relay present, and
    the battery management system is configured to connect the lithium-ion rechargeable battery to the controller by processing on-control of the third-relay.

11. The working vehicle according to claim 4, wherein the battery is a lithium-ion rechargeable battery,
    a lead-acid battery supplying power to the battery management system when the switch is turned on and a third-relay present, and
    the battery management system is configured to connect the lithium-ion rechargeable battery to the controller by processing on-control of the third-relay.

12. The working vehicle according to claim 5, wherein the battery is a lithium-ion rechargeable battery,
    a lead-acid battery supplying power to the battery management system when the switch is turned on and a third-relay present, and
    the battery management system is configured to connect the lithium-ion rechargeable battery to the controller by processing on-control of the third-relay.

13. The working vehicle according to claim 6, wherein the battery is a lithium-ion rechargeable battery,
    a lead-acid battery supplying power to the battery management system when the switch is turned on and a third-relay present, and
    the battery management system is configured to connect the lithium-ion rechargeable battery to the controller by processing on-control of the third-relay.

14. The working vehicle according to claim 7, wherein the battery is a lithium-ion rechargeable battery,
    a lead-acid battery supplying power to the battery management system when the switch is turned on and a third-relay present, and
    the battery management system is configured to connect the lithium-ion rechargeable battery to the controller by processing on-control of the third-relay.

* * * * *